United States Patent [19]
Horii

[11] 3,835,983
[45] Sept. 17, 1974

[54] METHOD AND APPARATUS FOR CONVEYANCE OF GOODS BY VIBRATING PLATES

[75] Inventor: Taro Horii, Hamamatsu, Japan

[73] Assignee: Maki Manufacturing Co., Ltd., Shizuoka-ken, Japan

[22] Filed: Nov. 12, 1971

[21] Appl. No.: 198,106

[30] Foreign Application Priority Data
Apr. 22, 1971  Japan.............................. 46-26348
Aug. 16, 1971  Japan.............................. 46-62150

[52] U.S. Cl............................ 198/220 BA, 198/30
[51] Int. Cl............................................ B65g 27/04
[58] Field of Search.............. 198/30, 220 BA, 106; 46/1 C

[56] References Cited
UNITED STATES PATENTS
3,667,590    6/1972    Mead............................ 198/220 BA Primary Examiner—James B. Marbert
Assistant Examiner—Bruce H. Stoner, Jr.
Attorney, Agent, or Firm—McGlew and Tuttle

[57] ABSTRACT

A method for conveyance of goods by vibration, and a transportation mat, in which a transportation mat, having an assemblage of many needle-like, bar-like, or fin-like elastic projections, planted closely together and aslant in a certain direction relative to the perpendicular to the surface of a vibrating plate, is arranged on such surface with the projections slanting in conformity with the conveyance pattern of the goods to be conveyed, to control the conveyance condition of goods, such as moving, change of direction, gathering, distribution, alignment, pooling, or others.

1 Claim, 32 Drawing Figures

FIG. IA
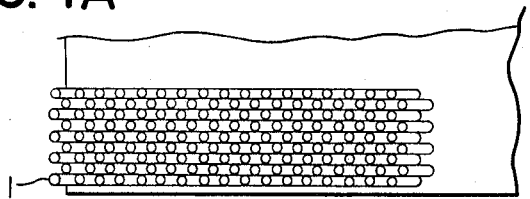
FIG. IB
FIG. 2A
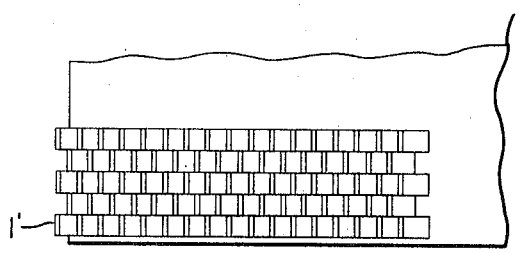
FIG. 3A
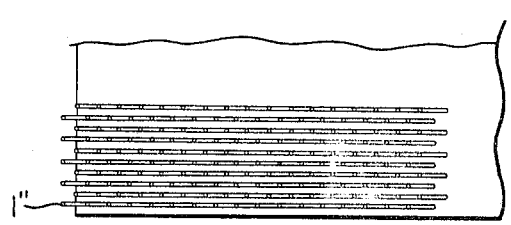
FIG. 2B
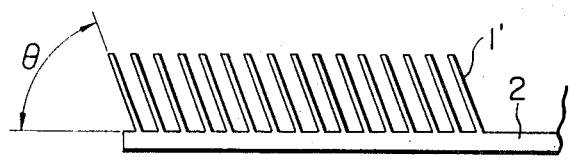
FIG. 3B
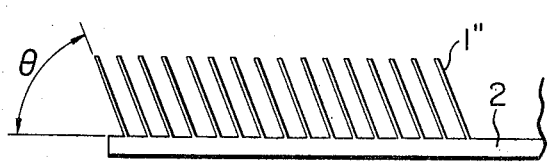

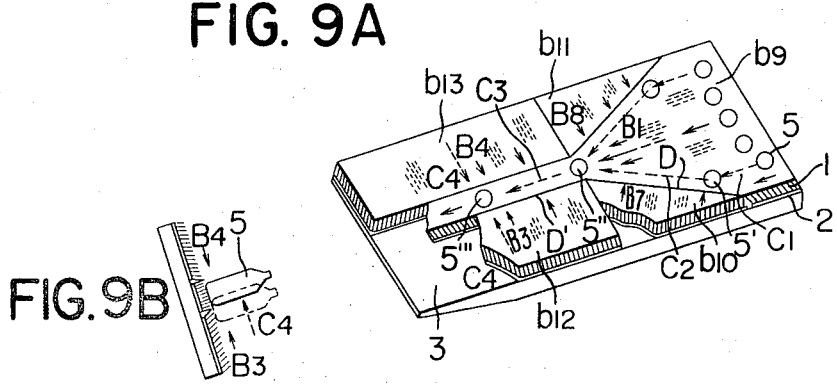
FIG. 9A
FIG. 9B
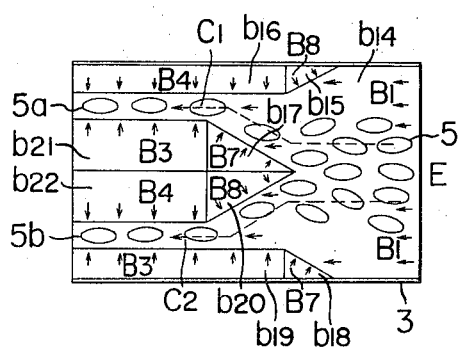
FIG. 10
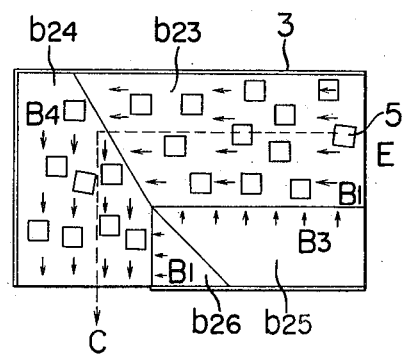
FIG. 11
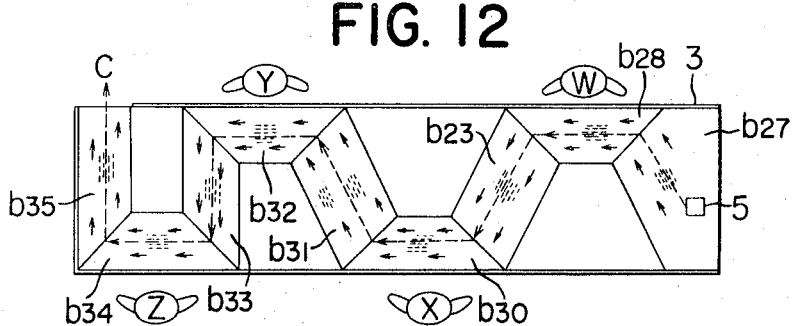
FIG. 12

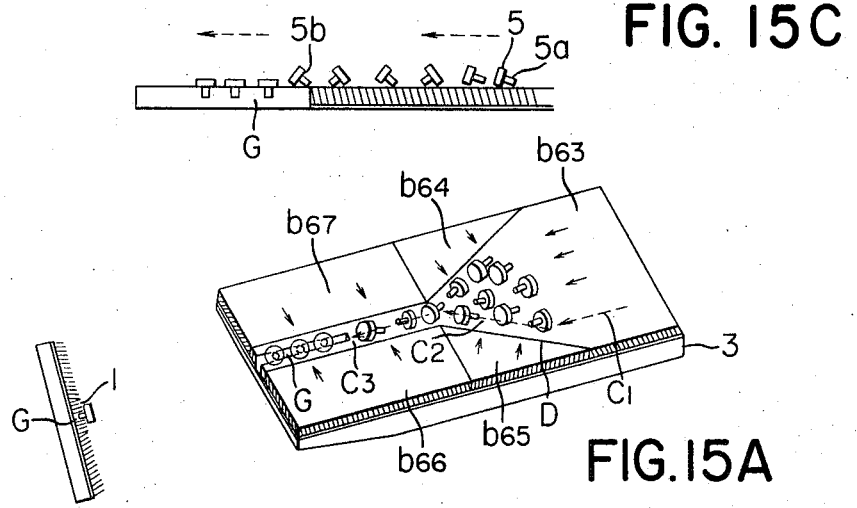
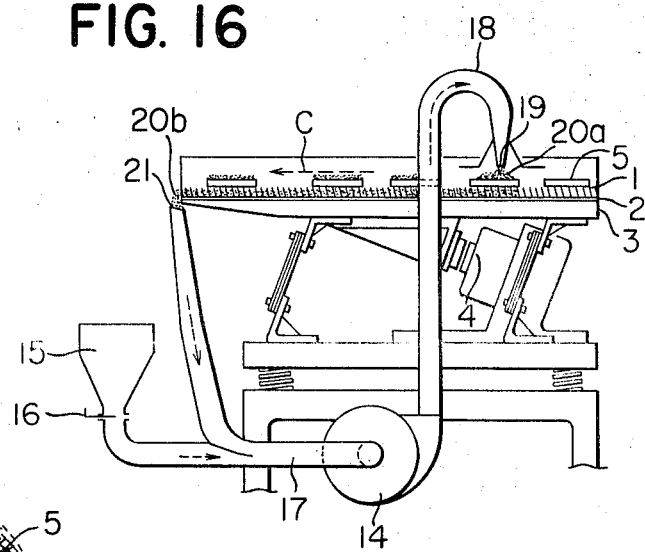
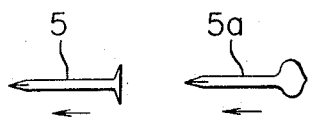
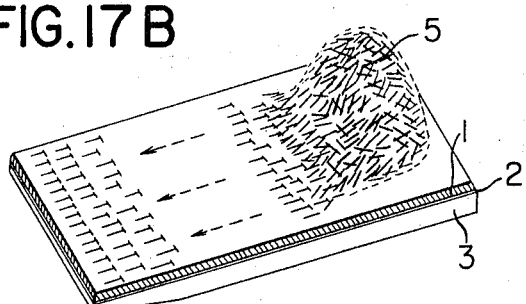

FIG. 18B 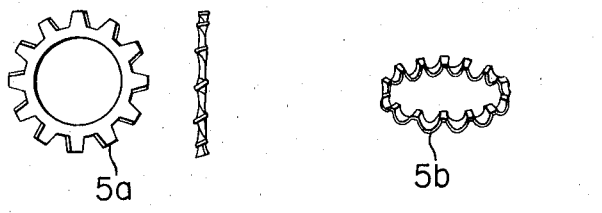 FIG. 18C FIG. 18D
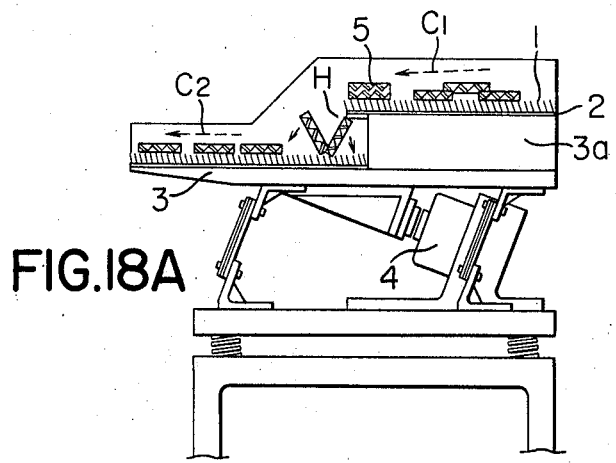
FIG. 18A
FIG. 19
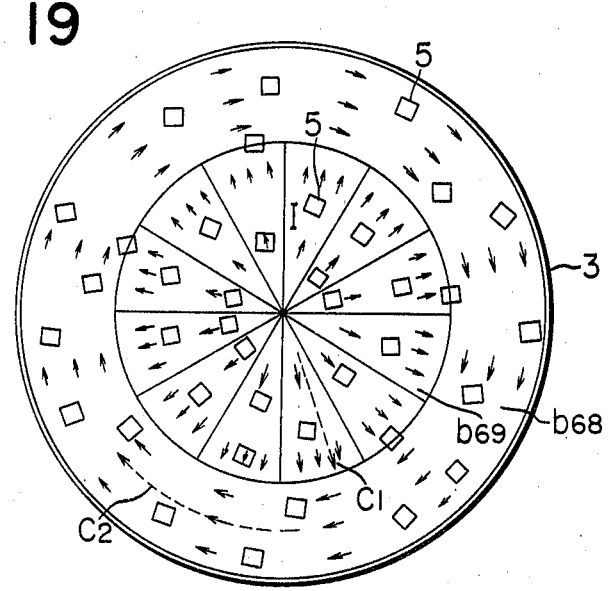

METHOD AND APPARATUS FOR CONVEYANCE OF GOODS BY VIBRATING PLATES

SUMMARY OF THE INVENTION

The present invention relates to a method and apparatus for conveyance of goods by vibrating plates, in which a brush or many closely planted needle-like, bar-like or fin-like elastic protruding parts, having the similar effect, are planted slantingly in a certain direction to a perpendicular to the surface of a vibrating plate. The assemblage condition of the protruding parts is designed according to the conveyance pattern of goods to be conveyed on the surface of the vibrating plate so that the conveyance performance of the goods is controlled.

The present invention provides a method and apparatus for control of conveyance, to be applied to conveyors, chutes, feeders or other transportation machines and assembly tables, and with which the movement direction of goods can be made desirably to change between forward or backward, right or left, or aslant, and besides, gathering, distribution, line-up or pooling of goods can be performed.

Namely, the present invention relates to a mechanism, by which goods can be moved in various directions during their conveyance on a conveyor, chute, feeder or table, having a vibration system, and particularly to a mechanical apparatus in which a transportation mat, having such brush-like elastic projections, planted slantingly to various directions, as a brush or an electric planting type of synthetic resin carpet, applied on the surface, corresponding to a trough, of a vibratory conveyor, chute, feeder, table or the like, whereby the goods are made to move in the slanting direction of the brush-like elastic projections during the operation of the vibrator, or be arranged in alignment along a boundary line of the mats, applied the slanting direction of projections being changed (for example in the right-angled direction or oppositely to each other), so that the moving direction can be controlled without need of any mechanical guide.

For an understanding of the principles of the invention, reference is made to the following description of typical embodiments thereof as illustrated in the accompanying drawings.

BRIEF DESCRIPTION OF THE DRAWINGS

In the Drawings:

FIGS. 1A, 2A and 3A are plan views illustrating various forms of transportation mats embodying the invention;

FIGS. 1B, 2B and 3B are elevation views corresponding, respectively, to FIGS. 1A, 2A and 3A;

FIG. 9A is a perspective view, partly broken away, illustrating a second example of the invention;

FIG. 9B is an end elevation view corresponding to FIG. 9A;

FIGS. 10, 11, and 12 are plan views of third, fourth and fifth examples of the invention;

FIG. 15A is a perspective view of an eighth example of the invention;

FIG. 15B is an end elevation view corresponding to FIG. 15A;

FIG. 15C is an explanatory sectional view corresponding to FIG. 15A;

FIG. 16 is an elevation view of a ninth example of the invention;

FIG. 17A is a perspective of a tenth example of the invention;

FIG. 17B and 17C are side elevation views of undamaged and damaged goods, respectively, corresponding to FIG. 17A;

FIG. 18A is a side elevation view illustrating an eleventh example of the invention;

FIG. 18B and FIG. 18C are, respectively, plan and elevation views of articles shown in FIG. 18A;

FIG. 18D is a plan view of other articles shown in FIG. 18A; and

FIG. 19 is a plan view illustrating a twelfth example of the invention.

DESCRIPTION OF THE PREFERRED EMBODIMENTS --;

FIGS. 1A and 1B show a transportation mat 2, comprising a plurality of closely planted bar-like elastic projections 1, slanting in a certain direction ($\theta = 60° - 75°$) to the vertical line; FIGS. 2A and 2B, similarly a transportation mat 2, having fin-like projections 1'; and FIGS. 3A and 3B, similarly a transportation mat 2, having needle-like projections 1''.

Figure 4:
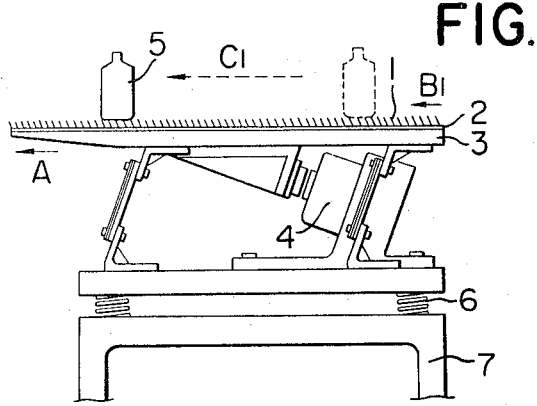
FIG. 4 is an elevation view illustrating a transportation mat with the projections slanted in the direction of vibration of a vibrating plate.
Figure 6:
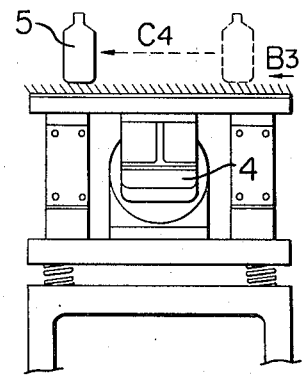
FIGS. 6 and 7 are elevation views respectively illustrating the projections slanting to the left and the projections slanting to the right.
Figure 5:
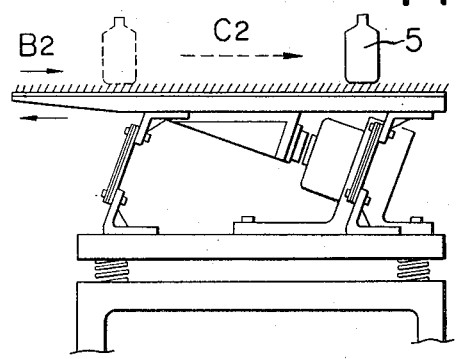
FIG. 5 is an elevation view illustrating a transportation mat with the projections slanting in a direction opposite to the direction of vibration of the vibrating plate.

FIGS. 4, 5 and 6 show the basic conveyance method according to the present invention to be used for a vibrator. 2 is a transportation mat (for example, as shown in FIGS. 1, 2 and 3), having a brush planted slantingly in a certain direction or a plurality of closely planted bar-like, fin-like or needle-lie elastic protruding parts 1 with a similar effect. 3 is a vibrating plate of the vibrator; 4, a vibrating device of the vibrator; 5, goods to be conveyed; 6, a vibration-proof device; and 7, a frame.

The arrow A indicates the vibration direction of the vibrating plate 3 itself; the arrow B, the slanting direction of the elastic projections of the transportation mat 2; and the dotted line of the arrow C, the proceeding direction of the goods to be conveyed.

FIG. 4 shows the case where there is applied a transportation mat 2 having the projections slanting in the same direction as the vibration direction A of the vibrating plate 3 of the vibrator.

This is a common way to use an ordinary electromagnetic vibrator. By the action of the vibrating device 4, the goods proceed in the direction $C_1$ in the same direction $B_1$ as the vibration direction, shown with the arrow A, of the vibrating plate. But the speed of conveyance is limited to 6 to 12m per minute in the conventional method.

When the transportation mat 2 according to the present invention is applied, by the action of the brush-like elastic projections 1, a high speed conveyance can be expected which is more than twice as high as that of the conventional method, and besides, has low consumption of power.

The goods are carried on the transportation mat 2, having elastic projections 1, so that the goods can be conveyed very quietly without any noise when the vibrating plate 3 is contacted with the goods 5.

FIG. 5 shows the case where there is applied a transportation mat 2, having projections aslant in the direction $B_2$, contrary to the vibration direction, shown with the arrow A, of the vibrating plate 3 of a vibrator.

In this case, the goods 5 move in the direction $C_2$ in the slanting direction $B_2$ of projections on the transportation mat 2 by the action of the elastic projections 1, oppositely to the vibration direction, shown with the arrow A, of the vibrating plate 3 of the vibrator.

FIG. 6 shows the case where there is applied a transportation mat 2, having projections slanting to left as indicated by $B_3$ at an angle of 90° to the vibration direction A of the vibrating plate 3 of a vibrator. In this case, goods move in the direction $C_4$ for conveyance in the slanting direction $B_3$ of the projections on the transportation mat 2 by the action of the elastic projections 1.

Figure 7:
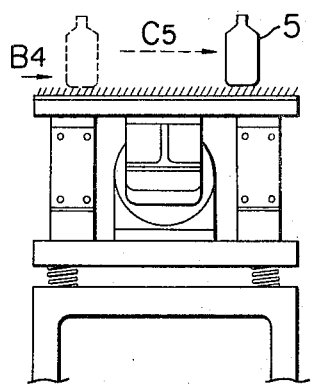

FIG. 7 shows the case where there is applied a transportation mat 2, having projections, slanting oppositely to the direction, shown in FIG. 6, namely in the left direction $B_4$ at the angle of 90° to the vibration direction A of the vibrating plate 3. The goods are carried in the direction as shown with the dotted line of the arrow $C_5$.

EXAMPLE 1

Figure 8A:
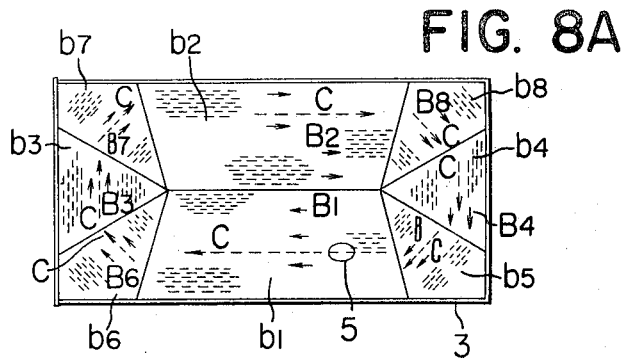
FIG. 8A is a plan view of one example of the present invention.
Figure 8B:
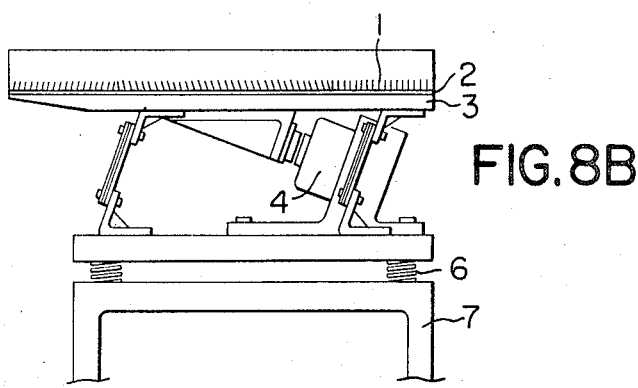
FIG. 8B is an elevation view corresponding to FIG. 8A.

In FIGS. 8A and 8B 2 shows a transportation mat comprising elastic projections 1 closely planted and slanting in a certain direction; 3 is the vibrating plate of a vibrator; and 4, a vibrating device. The sections $b_1$, $b_2$, $b_3$, $b_4$, $b_5$, $b_6$, $b_7$ and $b_8$ of the transportation mat 2, having elastic projections 1 planted slantingly in the respective different directions, as shown with the solid lines of the arrows $B_1$, $B_2$, $B_3$, $B_4$, $B_5$, $B_6$, $B_7$ and $B_8$, are applied on the vibrating plate of the vibrator. When the vibrating device is started in operation, goods can be removed in a rotary condition as shown with the arrows C.

EXAMPLE 2

FIGS. 9A and 9B show an example in which the present invention is used for arrangement of goods, and the sections $b_9$, $b_{10}$, $b_{11}$, $b_{12}$ and $b_{13}$ of a transportation mat 2, having projections planted slantingly in the respective different directions as shown with the solid lines of the arrows $B_1$, $B_3$, $B_4$, $B_7$ and $B_8$, are applied on the vibrating plate 3 of a vibrator. So, if the vibrating device is started in operation, goods 5 are imparted a movement in the direction $B_1$, from 5 to 5' as shown with the dotted line of the arrow $C_1$, and then are moved in a different direction $C_2$ to 5". After this they are arranged in a line to proceed on the section $b_9$ to the end.

Particularly speaking, the goods 5, supplied at random on the section $b_9$, move in the direction, corresponding to the slanting direction $B_1$ of the elastic projections 1, planted on the transportation mat 2. When they reach the position 5' on the boundary line of the section $b_{10}$, they receive an impetus in the slanting direction $B_7$ of the elastic projections on the transportation mat $b_{10}$. Thus, they are so controlled as to go in the direction $C_2$ along the boundary line D and proceed to 5". Further, they move forward in a line in the direction $C_3$, corresponding to the slanting direction $B_1$ of the elastic projections on the central part of the transportation mat $b_9$.

In this case, the transportation mats $b_{12}$ and $b_{13}$, having projections aslant in the respective inward directions $B_3$ and $B_4$, are applied on both sides of the part on which the goods are arranged in one line, so that the goods 5, disarranged outside the line, are so controlled by an inward moving power $C_4$ as to go in the centre, whereby they cannot get out of the line or be disarranged, but proceed in the direction $C_3$ in a line.

As above-mentioned, if various shapes of transportation mats 2, having elastic projections 1 planted aslant in said respective different directions, are applied in combination with each other, the goods receive an impetus on the boundary lines to move sideways in the directions $B_3$, $B_4$ or aslant in the directions $B_7$, $B_8$ so that the movement is controlled, and there is no need of any mechanical guide on the boundary lines D and D'.

Accordingly, such tall and unstable goods, having small diameters, as beer bottles, can be carried in a line smoothly, as a stream flows.

EXAMPLE 3

FIG. 10 shows an example in which the present invention is used for a distributor of goods.

When transportation mats $b_{14}$, $b_{15}$, $b_{16}$, $b_{17}$, $b_{18}$, $b_{19}$, $b_{20}$, $b_{21}$ and $b_{22}$ are applied on the vibrating plate 3 in various combinations of the slanting direction of elastic projections as shown with the solid lines of the arrow $B_1$, $B_3$, $B_4$, $B_7$ and $B_8$, goods 5, supplied at random from the side E, are respectively distributed into halves to be conveyed in two directions $C_1$ and $C_2$.

EXAMPLE 4

FIG. 11 shows the case that the present invention is used for changing the direction.

When goods are to be discharged out of the outlet of a vibratory conveyor in a direction at a right angle to the proceeding direction, transportation mats $b_{23}$ and $b_{24}$ are so applied on part of the transportation passage as to have elastic projections aslant in the respective directions, shown with the solid line of the arrows $B_1$ and $B_4$, so that the goods 5 proceed as shown with the dotted line of the arrow C. Accordingly, it is not necessary at all to install any mechanical discharging device on the outlet for changing the direction at a right angle. It will be sufficient if only the transportation mats $b_{23}$, $b_{24}$, $b_{25}$ and $b_{26}$ are applied in combination.

EXAMPLE 5

FIG. 12 shows an example in which the present invention is used for a conveyor in a flow process. When workers W, X, Y and Z are arranged on both sides of a vibratory conveyor, goods 5 can be moved in the direction C in zigzag among them.

Namely, when transportation mats $b_{27}$, $b_{28}$, $b_{29}$, $b_{30}$, $b_{31}$, $b_{32}$, $b_{33}$, $b_{34}$ and $b_{35}$ are applied in a zigzag combination as shown in the drawing, the goods proceed zigzag in the direction corresponding to the dotted line of the arrow C, whereby the goods 5 can be conveyed right in front of the workers W, X, Y and Z, even though their hands are not stretched out for the goods, so that the operation efficiency can be increased.

EXAMPLE 6

Figure 13:
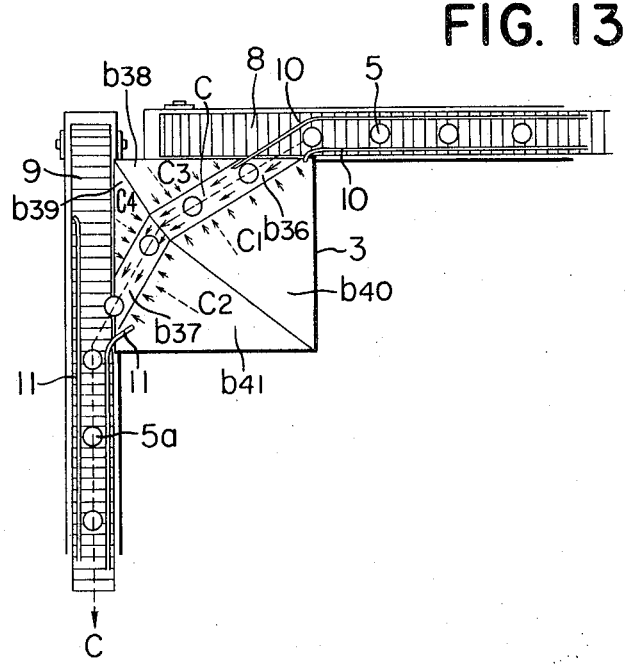
FIG. 13 is a plan view of a sixth example of the invention.

FIG. 13 shows an example in which the present invention is used in a device for transferring goods in a different direction at a corner at which conveyors ae connected with each other.

8 and 9 are chain conveyors with top slats. 10 and 11 are guides for goods 5 mounted on the respective frames of the chain conveyors and have opening parts facing the inside of the corner. 3 is the vibrating plate of a vibrator. Its one side is in parallel with the side face of the chain conveyor 8, while another side is in parallel with the side face of the chain conveyor 9. The vibrating plate and the conveyors are so installed as to be at the same level.

Transportation mats $b_{36}$ and $b_{37}$ are applied on the vibrating plate 3 of the vibrator for formation of a passage for the goods 5, with the slanting direction of elastic projections 1 corresponding to the goods moving direction as shown by the solid line arrows, and transportation mats $b_{38}$, $b_{39}$, $b_{40}$ and $b_{41}$, having projections aslant toward the center of the passage, are applied on the both sides of the passage, lest the line should be distrubed. Thus, an impetus is given as shown with the dotted lines of the arrows $C_1$, $C_2$, $C_3$ and $C_4$ toward the center of the passage, so that the goods are controlled to proceed along the line C without getting out of the passages $b_{36}$ and $b_{37}$.

More particularly speaking, the goods 5, accompanying the moving chain, proceed on the chain conveyor 8 along the guide 10 to the side opening part, adjacent vibrating plate 3 of the vibrator and are transferred onto the transportation mat $b_{36}$ of the vibrating plate 3 of the vibrator. In this case, an impetus is given in the direction shown with the dotted line of the arrow C on the transportation mat $b_{36}$, so that the goods can be moved on smoothly without any resistance and proceed in the direction C on the passages $b_{36}$ and $b_{37}$ of the vibrating plate 3 to be transferred at the side opening part of the chain conveyor adjacent with the other side of the vibrating plate.

In such a case, there has been hitherto used in general a method in which a turntable, having a disk on the same level as the chain conveyor, is rotated inside the corner and the goods to be transferred have been pushed by a moving pressure (a line pressure) of the goods on the chain conveyor, so that the goods may be transferred on. However, this method is not perfect, with such troubles that tall goods, square-shaped or oval-shaped bottles or the like are thrown down or damaged in this corner portion.

The present invention eliminates such defects. Goods proceed on the vibrating plate 3, contacted with the chain conveyor, by the action of brush-like elastic projections, planted aslant on the transportation mats $b_{36}$ and $b_{37}$, and are transferred on, so that they do not receive any line pressure. Accordingly, even goods, such as bottles or cans, having any shape, can be transferred on smoothly, changing the direction in the corner portion.

EXAMPLE 7

Figure 14A:
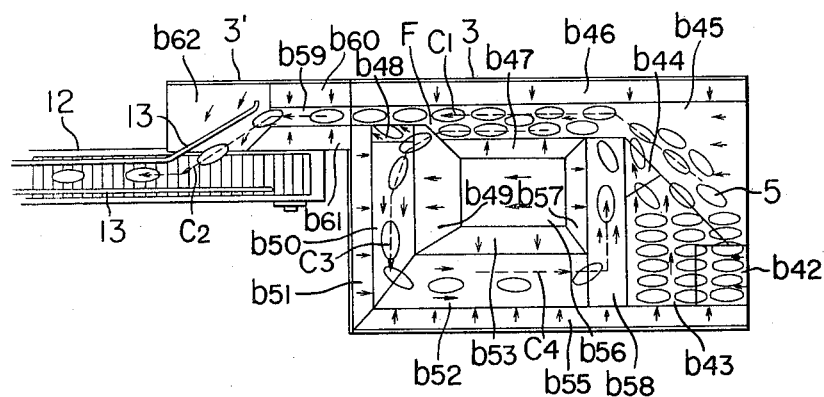
FIG. 14A is a plan view of a seventh example of the present invention.
Figure 14B:
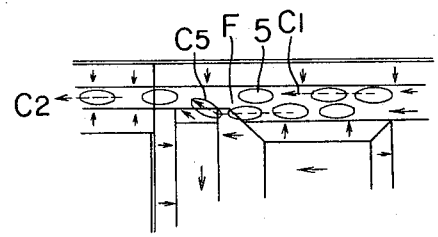
FIG. 14B is a partial plan view of FIG. 14A.

FIGS. 14A and 14B show an example in which the present invention is used in a device for aligning and feeding goods automatically.

12 is a chain conveyor and 13 a guide for goods 5. They are respectively installed on the conveyor frame and open on one-side to form a feeding part. 3 and 3' are vibrating plates of a vibrator. The upper surfaces have applied in combination, as shown in the drawing, transportation mats $b_{42}$, $b_{43}$, $b_{44}$, $b_{45}$, $b_{46}$, $b_{47}$, $b_{48}$, $b_{49}$, $b_{50}$, $b_{51}$, $b_{52}$, $b_{53}$, $b_{54}$, $b_{55}$, $b_{56}$, $b_{57}$, $b_{58}$, $b_{59}$, $b_{60}$, $b_{61}$ and $b_{62}$, having elastic projections 1 aslant in the respective directions, shown with solid line arrows.

In operation, a plurality of goods 5, pooled or supplied at random on one end of the vibrating plate 3 of the vibrator, are automatically, smoothly and quickly arranged to proceed in the direction, shown with the dotted arrows $C_1$ and $C_2$ for feeding the chain conveyor. The transportation mat $b_{45}$ is so applied in the combination as to make the width of the passage available for two lines of goods up to the point F and to carry the goods out in a line along the direction $C_2$ after the point F.

Now, the action of the point F shall be explained in detail. When the speed of the goods 5, coming one after another on the two-line part of the path $C_1$, corresponds to the conveyance speed on the one-line part of the path $C_2$, or when the goods are supplied in a larger quantity from the part $C_1$ than from the part $C_2$, the goods, existing in the inner line of the two lines, are deviated leftward out of the line at the point F and take the direction, shown with the dotted arrow $C_3$ to proceed, and further are returned in the direction $C_4$ to be carried back to the feeding part. When the goods 5 do not come successively but come partly in separated groups, the goods of the inner line are forced to enter into the gaps between the groups, lest the one-line part be interrupted. The shape of the transportation mat and the slanting direction of projections are so constructed as to meet the above-mentioned feeding operation.

Therefore, the present device can be operated with a high capacity.

As explained above, according to the present invention, one can obtain an automatic alignment and feeding device having a very simple structure. Also, the alignment is not performed forcibly by a mechanical mechanism or by guides. There is used only a simple but skilful combination of transportation mats, having elastic projections aslant in a certain direction. Therefore, goods, having various non-uniform shapes, such as circle, oval, square, etc., can be aligned and fed smoothly and quickly, with a high capacity and also automatically, without any manual help and without such troubles as tumbles, clogging, damaging.

EXAMPLE 8

FIGS. 15A, B and C show an example in which the present invention is used for alignment of convex goods.

The alignment and feeding device for convex goods comprises transportation mats $b_{63}$, $b_{64}$, $b_{65}$ and $b_{66}$, having projections aslant in the respective directions, shown with the solid line arrows, are applied on the upper face of the vibrating plate of a vibrator. Goods 5, supplied at random, are moved as shown with the dotted arrows $C_1$ and $C_2$ along the boundary line D of the transportation mats to proceed in a line along the passage $C_3$ in the central portion. A notched part G, in which the elastic projections 1 are cut off, extends along the middle of passage $C_3$ toward the central end of the transportation mat $b_{63}$, so that the stems 5a of the goods drop in said notched groove and the goods proceed with the bearing face 5b of the head supported by the elastic projections 1 on both sides of the notched part G.

This device can arrange the convex goods 5 in a certain direction, without employing any mechanical mechanism and only by applying, in a skilful combination, the transportation mats $b_{63}$, $b_{64}$, $b_{65}$, $b_{66}$ and $b_{67}$, having the elastic projections 1 aslant in a certain respective direction. Therefore, it is simple and, besides, has a remarkable economical effect.

EXAMPLE 9

FIG. 16 shows an example in which the present invention is used in a powdering device for goods.

In order to make sticky goods easy to be handled, or in case that it is necessary to eliminate stickiness for some reason, it is usual to perform the operation of powdering with dogtooth violet powders, starch powders, or the like.

The present invention provides an automatic powdering device.

2 is a transportation mat, having a plurality of elastic projections 1, slanting in a certain direction and planted closely with a brush-like shape. 3 is the vibrating plate of a vibrator; 4, a vibrating device; 5, goods; and 14, a blower, by which the powders, supplied from a hopper 15 through a regulating valve 16 and a suction pipe 17, are scattered on the goods through the outlet 19 of a discharge pipe 18. 20a shows powders stuck on the upper part of the goods. 20b shows surplus powders which are returned to the suction pipe 17 from a suction mouth 21.

Now, the operation shall be explained. When the vibrating device 4 is started in operation, the goods 5, supplied from one end of the vibrating plate 3 of the vibrator, proceed by the accelerating action of the transportation mat 2 in the direction, shown with the dotted arrow C, corresponding to the slanting direction of the elastic projections 1. On the other hand, when the blower is operated, a proper quantity of powders 20 is supplied by the suction pipe from the feed hopper 15 through the regulating valve 16, to be scattered as powders 20a on the upper face of the moving goods 5 from the outlet 19 through the dischange pipe 18. Further, some of the powders fall down among the brush-like elastic projections 1 and are blown up by the vibration on the upper face of the transportation mat 2 to be attached to the lower face of the goods 5, and then, proceed forward.

The surplus powders 20b are returned to the blower 14 from the suction month 21 at the way out.

As explained above, the powdering device assures that the sticky goods 5 come out with a proper quantity of powders, supplied automatically on the upper and lower faces, while the goods pass on the vibratory conveyor.

EXAMPLE 10

FIGS. 17A, B, C show an example in which the present invention is used in a conveyor for inspection of nails.

Concerning such goods as nails or the like, which are liable to be entangled, difficult in handling, and moreover, produced in a large quantity, the inspection by eye is generally performed in order to pick up inferior goods. In this case, there is no suitable method to disperse the goods in a plane, Under existing circumstances, a manual operation is selected.

The present invention provides a vibratory conveyor, in which the goods are automatically dispersed and carried in a large quantity and, besides, inferior goods can be picked up using only inspection by eye.

2 is a transportation mat, having elastic projections 1, slanting in a certain direction and planted in a brush-like shape; and 3, the vibrating plate of a vibrator. 5 shows goods in a normal condition and 5a, an example of inferior goods, having the head crushed.

The operation shall be explained. A pile of goods, supplied in a heap at one end of the vibrating plate, falls gradually down by the vibration of the vibrating plate 3 as well as the action of the brush-like elastic projections 1 of the transportation mat 2, and the goods are dispersed more and more in proportion to their movement and arranged in a plane. Moreover, all of the goods are controlled to proceed in a position facing the same direction, so that satisfactory goods 5 and inferior goods 5a can be discerned clearly and easily. Therefore, a large quantity of goods can be efficiently checked by only one person.

EXAMPLE 11

FIGS. 18A-18D show the case where the present invention is used in an alignment device for goods liable to be entangled with difficulty of separation.

2 is a transportation mat, having elastic projections 1, slanting in a certain direction and planted in a brush-like shape. 3 is the lower vibrating plate of a two-stage vibrator and is composed in one piece with the upper vibrating plate 3a. 4 is a vibrating device. The goods 5 may be such as a toothed washer 5a or a retainer 5b for a ball bearing, which it is difficult to separate from entanglement.

The operation shall be explained. The goods 5, supplied at random in a heap on the upper vibrating plate 3a of the vibrator, are moved in the direction $C_1$ in entanglement or in a heap by the action of the vibrating device 4 of the vibrator. When they fall down on the lower vibrating plate 3 at the end portion H of the upper vibrating plate 3a, they are freed from entanglement or heaping to proceed in the direction $C_2$ in a line on the transportation mat 2 of the lower vibrating plate 3. The present invention thus provides an improved alignment device for easily entangled goods.

EXAMPLE 12

FIG. 19 shows an example in which the present invention is used in a table for pooling goods.

3 is the vibrating plate of a vibrator. $b_{68}$ and $b_{69}$ are the respective transportation mats 2, having elastic projections 1 planted slantingly in the direction of the solid line arrows.

In this apparatus, when the goods 5 are supplied on the central part 1 thereof, by the action of the transportation mats $b_{69}$, applied radially on the vibrating plate 3, the goods 5 are moved radially to be dispersed along the direction toward to the circumference and move in the direction, shown with the dotted arrow $C_2$, on the transportation mats $b_{68}$, applied on the peripheral part, to be pooled uniformly along the whole circumference.

As above, according to the present invention, transportation mats 2, having brush-like elastic projections 1 planted slantingly in any desired direction, are applied on vibratory conveyors, chutes, feeders and tables, so that the goods moving speed can be accelerated and the moving direction can be set quite freely, and besides, if the mats are applied with the projections, aslant respectively in a different direction, the movement line or the position can be controlled along a boundary line without need of any mechanical guide or mechanism. Therefore, the apparatus does not damage the goods. Moreover, the apparatus is economical and efficient, and has a great effect in a practical use because an extensive area of application can be developed.

What is claimed is:

1. An automatic alignment and feeding apparatus comprising, in combination, a vibrating plate having a supply portion and a receiving portion, the receiving portion being arranged to contain a plurality of goods; a conveyor having a goods inlet adjacent and in communication with said supply portion; a plurality of transportation mats on the surface of said vibrating plate, each transportation mat having a plurality of closely adjacent elastic projections slanting in a predetermined direction to the perpendicular to the surface of said vibrating plate; said transportation mats being arranged on said surface in a manner to define a passage along whch the goods proceed from said receiving portion to said supply portion; the width of said passage varying step-wise from a plurality of lanes adjacent said receiving portion to two lanes, and from two lanes to one lane at said supply portion, said transportation mats including guide mats, having elastic projections slanting laterally toward said passage extending along both sides of said passage; said transportation mats further defining control portions descharging an excessive quantity of goods moving along the two-lane portion of said path toward said one-lane portion laterally outside the passage, and forcing goods into said one-lane portion of said passage from the side when there is an interruption in the sequence of goods moving into said one-lane portion of said passage; said transportation mats additionally defining a by-pass portion through which goods, discharged in a lateral direction by said control portion, are returned toward said receiving portion of said vibrating plate. --

\* \* \* \* \*